United States Patent [19]

Nitoh et al.

[11] Patent Number: 4,917,957
[45] Date of Patent: Apr. 17, 1990

[54] WELD-CONTAINING POLYARYLENE SULFIDE RESIN MOLDED ARTICLE

[75] Inventors: Toshikatsu Nitoh; Toshifumi Nonaka, both of Fuji, Japan

[73] Assignee: Polyplastics Co., Ltd., Osaka, Japan

[21] Appl. No.: 226,160

[22] Filed: Jul. 29, 1988

[30] Foreign Application Priority Data

Aug. 3, 1987 [JP] Japan .................. 62-194022
Sep. 2, 1987 [JP] Japan .................. 62-219785
Sep. 30, 1987 [JP] Japan .................. 62-246361

[51] Int. Cl.$^4$ .............................. B32B 9/04
[52] U.S. Cl. ................... 428/447; 428/419; 428/411.1; 524/188; 524/262; 524/265
[58] Field of Search ................ 428/419, 447

[56] References Cited

U.S. PATENT DOCUMENTS

| | | | |
|---|---|---|---|
| 4,337,182 | 6/1982 | Needham | 524/609 |
| 4,451,601 | 5/1984 | Blackwell | 524/263 |
| 4,482,665 | 11/1984 | Dix | 524/262 |
| 4,528,310 | 7/1985 | Blackwell | 524/86 |
| 4,680,326 | 7/1987 | Leland et al. | 424/106 |
| 4,690,969 | 9/1987 | Takezawa et al. | 524/413 |
| 4,703,074 | 10/1987 | Izutsu et al. | 524/262 |
| 4,740,425 | 4/1988 | Leland et al. | 528/388 |
| 4,782,195 | 11/1988 | Blackwell et al. | 524/609 |

FOREIGN PATENT DOCUMENTS

| | | |
|---|---|---|
| 0062806 | 10/1982 | European Pat. Off. . |
| 0074632 | 3/1983 | European Pat. Off. . |
| 0103300 | 9/1983 | European Pat. Off. . |
| 0100913 | 2/1984 | European Pat. Off. . |
| 0199278 | 10/1986 | European Pat. Off. . |

*Primary Examiner*—John Kight
*Assistant Examiner*—T. Mosley
*Attorney, Agent, or Firm*—Nixon & Vanderhye

[57] ABSTRACT

A molded article useful for electrical parts, such as connectors, has at least one weld portion and is obtained by injection molding of a polyarylene sulfide composition comprising a polyarylene sulfide and an alkoxysilane such as aminoalkoxysilanes, epoxyalkoxysilanes, mercaptoalkoxysilanes and vinylalkoxysilanes, and optionally an inorganic filler.

10 Claims, No Drawings

WELD-CONTAINING POLYARYLENE SULFIDE RESIN MOLDED ARTICLE

FIELD OF THE INVENTION

The present invention relates to a molded article obtained by the injection molding of an improved polyarylene sulfide resin composition. More particularly, the present invention, relates to a molded article obtained by the injection molding of a polyarylene sulfide resin composition which is improved so as to enhance the strength of the weld of said article, such as a connector for electric appliances.

BACKGROUND OF THE INVENTION

Recently, thermoplastic resins having high heat resistance and high chemical resistance have been required as a material for the components of electric, electronic, automobile and chemical apparatus. In this regard, a polyarylene sulfide resins represented by polyphenylene sulfide represents one class resins which meets this requirement. However, polyarylene sulfide resins are disadvantageous in that the part formed by the fusion bonding of the heads of at least two melt flows of the resin joined in a mold cavity during molding (i.e., the weld) exhibits remarkably poor mechanical properties. Therefore, a polyarylene sulfide resin molded article containing a weld tends to break along the weld when subjected to thermal or mechanical stresses. Particularly, a polyarylene sulfide molded article having complicated shape produced by ultrasonic welding is more problematic in this regard. A polyarylene sulfide resin is a material suitable for precision molding, so that a molded article of the resin will necessarily contain a weld in most cases. Accordingly, many attempts have been made to improve the mechanical properties of the weld thereof, among which, the following techniques may be mentioned:

(1) improvement in mold design; for example, a mold having a cold-slug well is used and the corresponding part is cut off after the resulting molded article is cooled. Alternatively, the temperature drop of the material in the fusion bonding section is inhibited by increasing the number of gates or changing the positions of gates, (2) necessary holes are formed by fabrication to inhibit the formation of a weld during molding, (3) a composition having an improved fluidity is used (see Japanese Patent Laid-Open Nos. 11357/1984, 11358/1984 and 70157/1982) and (4) an inorganic filler which effectively enhances the strength of the weld is used (see Japanese Patent Laid-Open No. 70157/1982).

However, these methods have the following problems. That is, according to the method (1), there are many welds which are unavoidable and thus the use of a cold-slug well lowers the production yield.

According to the method (2), the number of processing steps is increased which thereby increases the cost of the molded articles. Although the methods (3) and (4) appreciably improve the mechanical properties of the weld, the strength of the resulting weld is insufficient, so that the molded articles to which the methods can be applied are limited.

Thus, a polyarylene sulfide resin has been used only in limited fields in spite of its high heat resistance and its excellent precision moldability, because it gives a molded article containing welds that exhibit poor mechanical properties.

SUMMARY OF THE INVENTION

The present invention is primarily directed towards overcoming the above disadvantageous with respect to the weld of a polyarylene sulfide resin molded article (which contains a weld as an unavoidable result of the mold design. The molded articles according to this invention include functional precision components having many holes or many bosses, the demand for which has recently increased. One aspect of this invention resides in the discovery that the behavior of the resin at solidification and crystallization is changed by the addition of a specified alkoxysilane, so that the fusion characteristics of the resin in the welding section are improved, which thereby improves the mechanical properties of the weld.

DETAILED DESCRIPTION OF THE INVENTION

The present invention provides a polyarylene sulfide resin molded article containing a weld at least in a part thereof which is obtained by injection molding of a polyarylene sulfide resin composition obtained by adding 0.01 to 5 parts by weight of (B-1) an aminoalkoxysilane or (B 2) an alkoxysilane selected from the group consisting of epoxyalkoxysilanes, mercaptoalkoxysilanes and vinylalkoxysilanes and (C) zero to 400 parts by weight of an inorganic filler to (A) 100 parts by weight of a polyarylene sulfide resin.

The molded article according to this invention has at least one weld portion and is obtained by injection molding of a polyarylene sulfide composition comprising (A) 100 parts by weight of a polyarylene sulfide and 0.01 to 5 parts by weight of an alkoxysilane (B-1) or (B-2).

The composition may further comprise (C) up to 400 parts by weight of an inorganic filler.

It is preferable that the polyarylene sulfide is polyphenylene sulfide or one comprising 90 mole percent or greater of phenylene sulfide units and (B-1) the aminoalkoxysilane has one or more amino groups and two or three alkoxy groups, the alkoxy group having 1 or 2 carbon atoms.

The polyarylene sulfide is polyphenylene sulfide or one comprising 70 mole percent or larger of phenylene sulfide units. The silane compound (B-2) has at least one epoxy, mercapto or vinyl group and two or three alkoxy groups each having 1 to 3 carbon atoms such as methoxy and ethoxy.

In addition, the invention provides parts for an electric instrument, a precision instrument or a chemical apparatus comprising the molded article as defined above.

The resin (A) to be used as a base in the present invention is a polyarylene sulfide resin, which comprises at least 90 molar % of a repeating unit represented by the structural formula:

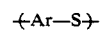

(wherein Ar is an aryl group). A representative example thereof includes polyphenylene sulfide comprising at least 90 molar % of a repeating unit represented by the structural formula:

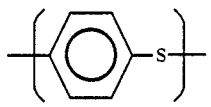

Among them, polyarylene sulfide resins having a melt viscosity as determined at 310° C. and at a shear rate of 1200/sec of 10 to 20000 poise, particularly 100 to 5000 poise are particularly suitable.

The resin to be used as a base in the present invention may contain a small amount of a thermoplastic resin other than a polyarylene sulfide resin as an auxiliary component depending upon the object in addition to a polyarylene sulfide resin as described above. The thermoplastic resin that may be employed is not specifically limited, provided that it is stable at high temperature. Examples thereof include aromatic polyesters prepared from aromatic dicarboxylic acids and diols or aromatic oxycarboxylic acids (for example, polyethylene terephthalate and polybutylene terephthalate), polyamide, polycarbonate, ABS, polyphenylene oxide, polyalkyl acrylate, polyacetal, polysulfone, polyether sulfone, polyether imide, polyether ketone and fluororesins, which may be used as a mixture of two or more of them.

The aminoalkoxysilane (B1) used in the present invention may be any silane compound, provided that it has at least one amino group and two or three alkoxy groups in its molecule. Examples thereof include γ-aminopropyltriethoxysilane, γ-aminopropyltrimethoxysilane, γ-aminopropylmethyldiethoxysilane, γ-aminopropylmethyldimethoxysilane, N-β(aminoethyl)-γ-aminopropyltriethoxysilane, N-β(aminoethyl)-γ-aminopropyltrimathoxysilane, N-β(aminoethyl)-γamino propylmethyldiethoxysilane, N-β(aminoethyl)-γ-aminopropylmethyldimethoxysilane, N-phenyl-γ-aminopropyltriethoxysilane and N-phenyl-γ-aminopropyltrimethoxysilane, among which γ-aminopropyltriethoxysilane and γ-aminopropyltrimethoxysilane are particularly preferred.

The component (B2) blended in the composition according to the present invention is one or more silane selected from among epoxyalkoxysilanes, mercaptoalkoxysilanes, and vinylalkoxysilanes. Any epoxyalkoxysilane is effective in so far as it is a silane compound having at least one epoxy group and two or three alkoxyl groups per molecule thereof. Examples of such an epoxyalkoxysilane include γ-glycidoxypropyltrimethoxysilane, β-(3,4-epoxycyclohexyl) ethyltrimethoxysilane, and γ-glycidoxypropyltriethoxysilane. Any mercaptoalkoxysilane is effective in so far as it is a silane compound having at least one mercapto group and two or three alkoxyl groups per molecule thereof. Examples of such a mercaptoalkoxysilane include γ-mercaptopropyltriethoxysilane. Any vinylalkoxysilane is effective in so far as it is a silane compound having at least one vinyl group and two or three alkoxyl groups per molecule thereof Examples of such a vinylalkoxysilane include vinyltriethoxysilane, vinyltrimethoxysilane, and vinyltris(β-methoxyethoxy)silane.

The amount of the above-mentioned alkoxysilane to be used in the present invention is 0.01 to 5 parts by weight, preferably 0.1 to 2 parts by weight, per 100 parts by weight of the polyarylene sulfide resin. When it is less than 0.01 part by weight, the beneficial weld strengthening effects cannot be obtained. When it is excessive, the mechanical properties of the resulting molding are unfavorably poor.

According to the present invention, the inorganic filler (C) is not always essential. However, the addition thereof is preferred to obtain a molded article excellent in mechanical strength, heat resistance, dimensional stability (resistance to deformation and warpage), electric properties and so on. Depending upon the object, a fibrous, powdery, granular or flaky inorganic filler may be used as the component (C).

Examples of the fibrous inorganic filler include glass fiber, asbestos fiber, carbon fiber, silica fiber, silica/alumina fiber, alumina fiber, zirconia fiber, boron nitride fiber, silicon nitride fiber, boron fiber, potassium titanate fiber and fibrous materials of metals such as stainless steel, aluminum, titanium, copper or bass, among which glass fiber and carbon fiber are representative. Further, a high-melting organic fibrous material such as polyamide, fluororesin, polyester resin or acrylic resin may be used.

Examples of the powdery and granular fillers include carbon black, silica, quartz powder, glass bead, glass powder, silicates such as calcium silicate, aluminum silicate, kaolin, talc, clay, diatomaceous earth and wollastonite; metal oxides such as iron oxides, titanium oxide, zinc oxide and alumina; metal carbonates such as calcium carbonate and magnesium carbonate; metal sulfates such as calcium sulfate and barium sulfate; silicon carbide, silicon nitride, boron nitride and various metal powders.

Examples of the flaky filler include mica, glass flake and various metal foils.

These inorganic fillers may be used either alone or as a mixture of them. The simultaneous use of a fibrous filler, particularly glass or carbon fiber, and a granular and/or flaky filler is preferred in order to improve the mechanical strength, dimensional accuracy and electric properties of the composition simultaneously.

When an inorganic filler as described above is used, it is preferred to use an integrating or finishing agent therewith. Examples of the integrating of finishing agent include functional compounds such as epoxy, isocyanate, silane and titanate compounds. These functional compounds may be used in a state adhering to an inorganic filler as a finishing or integrating agent or may be added together with an inorganic filler in preparing the composition.

The amount of the inorganic filler used per 100 parts by weight of the polyarylene sulfide resin used is 0 to 400 parts by weight, preferably 10 to 250 parts by weight. If the amount is less than 10 parts by weight, the mechanical strength will be poor, while if the amount is too large, the molding operation will be troublesome to give a molded article problematic in mechanical strength.

The composition according to the present invention may further contain known substances which are ordinarily added to thermoplastic or thermosetting resins. Namely, the composition may suitably contain a stabilizer such as antioxidant or ultraviolet absorber, antistatic agent, flame retardant, coloring agent such as dye or pigment, lubricant or crystallization accelerator (nucleating agent) depending upon the required performances.

The polyarylene sulfide resin composition according to the present invention can be prepared with an ordinary equipment for the preparation of a synthetic resin composition and by an ordinary process therefor. That is, the polyarylene sulfide resin composition can be prepared by a process which comprises mixing the required components and kneading and extruding the obtained mixture with a single-or twin-screw extruder to obtain a pellet. In this process, a portion of the required components may be mixed as a master batch, followed by the molding of the obtained mixture.

The molded article containing weld at least in a part thereof according to the present invention is a molded article which is produced by injection molding and contains, at least in a part thereof, a weld formed by the fusion bonding of the heads of at least two melt flows of the resin joined in a mold cavity. Such a weld tends to be formed when a molded article has void or when a molded article has differing thicknesses such that the resin material cannot always be made to flow from the thick part to the thin part in the mold cavity. Further, the formation of a weld is unavoidable when the mold used has two or more gates or when a ring-shaped, cylindrical or square-tubular article is molded using a mold having one gate. Such a weld generally appears as a linear mottle or a visibly perceptible region of joined resin flows on the surface of a molded article.

The molded article containing such a weld include various functional components, for example, electronic components such as coil bobbins, print bases and chassis for electronic components; components for electric heater such as lamp sockets, drier grilles, thermostat bases and thermostat cases; motor components such as brush holders, bearing and motor cases; precision components such as pawls for duplicating machines, diaphragms for cameras and cases and base plates of watches; automobile components such as exhaust gas-circulating valves, carburetors, terminal blocks of oil meters and housings of tachometers and batteries and components for chemical equipment such as cleaning frames, insulators, pipe blankets, pump casings and tower fillers.

Although these functional components do not necessarily always have a weld at least in a part thereof, it is difficult from the viewpoint of their functionality to avoid the formation of weld. Further, the above functional components are only examples of the molded articles according to the present invention, i.e., the molded articles are not limited to the specific articles mentioned above.

There are many small and large molded articles containing welds other than the above-mentioned functional components. The present invention relates to all weld-containing polyarylene sulfide molded articles, which include functional components as described above and other weld-containing articles, and seeks to overcome the strength disadvantages of the article's weld by adding a specified amount of an aminoalkoxysilane. Thus, the present invention is remarkably effective in enhancing the practical strength of many molded articles.

It can be understood from the above description and the Examples which follow, that the weld-containing polyarylene sulfide resin molded article according to the present invention has the advantages which will be described below. That is, according to the present invention, the disadvantages with respect to the weld of the polyarylene sulfide resin molded articles according to the prior art are overcome to thereby give polyarylene sulfide resin molded articles having a remarkably enhanced practical strength, which will contribute to improved performances of various functional components. For example, (1) the weld strength is enhanced by 1.2 to 1.5 times, (2) the critical deformation of a molded hole in forcing a pin thereinto is enhanced to reduce pin breakage in which thereby reduces the number of rejected products formed in the assembly and (3) the self-tap strength of a molded hole is enhanced, so that components which have been tapped up to this time can be assembled by self-tap, thus the number of processing steps being reduced.

The connector of the present invention is composed of components as described above and can be easily and economically advantageously produced by mixing the components, melting and kneading the obtained mixture with a single- or twin-screw extruder to obtain a pellet and injection-molding the pellet. The procedure for producing a connector is not however limited to the above procedure, but includes a process which comprises preparing a master batch comprising part of the components, mixing this master batch with the residual part thereof and molding the obtained mixture. Although the shape, dimensions and the number of electrodes of the connector according to the present invention are not limited, the effect of the present invention is particularly remarkable for a connector having a number of electrodes, because such a connector typically has a number of welds and thus a number of corresponding sites for flash formation.

It can be understood from the above description and the following Examples that the connector of the present invention has the following advantages:

(1) the connector is improved in various strengths, particularly in the critical strength of press fitting of a pin, which is one of the important properties of a connector. Accordingly, the disadvantage of the polyarylene sulfide resin connector according to the prior art (i.e., that it tends to break when a pin is press fitted thereinto) can be solved to reduce rejected parts, (2) the generation of flash is reduces and thus a flash removing step may be avoided, which is economically advantageous, and (3) the connector can withstand temperatures at which solder melts, because it is formed of polyarylene sulfide resin as a base material. Therefore, the connector can be applied to the fields of surface mounting technology.

The present invention will now be described in more detail by referring to the following nonlimiting Examples.

USE OF AMINOALKOXYSILANE

Example 1

γ-Aminopropyltriethoxysilane was added to a polyphenylene sulfide resin (mfd. by Kureha Chemical Industry Co., Ltd.; "Fortron KPS") in an amount given in Table 1, followed by the premixing with a Henschel mixer for 5 minutes. A commercially available glass fiber having a diameter of 13 μm and a length of 3 mm was added to the obtained premix in an amount given in Table 1, followed by the mixing for 2 minutes. The obtained mixture was pelletized with an extruder having a cylinder temperature of 310° C. The obtained pellet was injection molded at a cylinder temperature of 320° C. and at a mold temperature of 150° C. by using a mold having two gates so as to provide a test piece for tensile testing containing a weld in its center. The obtained test piece was examined for strength and elongation of the weld in tension. The results are shown in Table 1.

Comparative Example 1

A pellet was prepared by the same process as that described in Example 1 except that γ-aminopropyltriethoxysilane was not used. This pellet was molded into a test piece, followed by the examination thereof for strength and elongation of the weld in tension in a similar manner to that used in Example 1. The results are shown in Tables 1 and 2.

Examples 2 to 5

A pellet was prepared by the same process as that described in Example 1 except that an aminoalkoxysilane given in Table 2 was used instead of the γ-aminopropyltriethoxysilane. This pellet was molded into a test piece, followed by the examination thereof for strength and elongation of the weld in tension in a similar manner to that used in Example 1. The results are shown in Table 2.

Examples 6 to 8 and Comparative Examples 2 to 4

The same procedure as that described in Example 1 was repeated except that the γ-aminopropyltriethoxysilane and the glass fiber were replaced by those given in Table 3 respectively. The results are shown in Table 3.

Examples 9 to 11 and Comparative Examples 5 to 7

The same procedure as that described in Example 1 was repeated except that γ-aminopropyltriethoxysilane and glass fiber were used each in an amount given in Table 4. The results are shown in Table 4.

Example 12 and Comparative Example 8

The pellets prepared in Examples 1 to 4 and Comparative Example 1 were molded with an injection machine at a cylinder temperature of 320° C. and at a mold temperature of 150° C. into cylindrical bearings having an inside diameter of 11 mmφ and an outside diameter of 12.5 mmφ.

A steel ball having a diameter of 14.2 mmφ was forced into the obtained bearing to determine the breaking strength. The results are shown in Table 5.

Example 13 and Comparative Example 9

The pellets prepared in Examples 1 to 4 and Comparative Example 1 were molded with an injection machine at a cylinder temperature of 320° C. and at a mold temperature of 150° C. into circular perforated plates (inside diameter 30 mmφ, outside diameter 80 mmφ, thickness 3 mmφ, one pin gate).

The obtained plates were examined for weld breaking strength with a three-point bending tester. The results are shown in Table 6.

TABLE 1

(Example 1 and Comparative Example 1)

| | polyphenylene sulfide resin (parts by weight) | γ-aminopropyl-triethoxysilane (parts by weight) | glass fiber (parts by weight) | weld strength [kg/cm²] | weld elongation at break [%] |
|---|---|---|---|---|---|
| Example 1-1 | 100 | 0.1 | 70 | 550 | 0.4 |
| Example 1-2 | 100 | 0.3 | 70 | 670 | 0.5 |
| Example 1-3 | 100 | 0.5 | 70 | 720 | 0.7 |
| Example 1-4 | 100 | 1.0 | 70 | 780 | 0.7 |
| Example 1-5 | 100 | 2.0 | 70 | 750 | 0.6 |
| Comparative Example 1 | 100 | — | 70 | 500 | 0.3 |

TABLE 2

(Examples 2 to 5 and Comparative Example 1)

| | Polyarylene sulfide resin (parts by weight) | aminoalkoxysilane (parts by weight) | glass fiber (parts by weight) | weld strength [kg/cm²] | weld elongation at break [%] |
|---|---|---|---|---|---|
| Example 2 | 100 | γ-aminopropyl-trimethoxysilane (1.0) | 70 | 760 | 0.7 |
| Example 3 | 100 | γ-aminopropyl-methyldiethoxy-silane (1.0) | 70 | 650 | 0.5 |
| Example 4 | 100 | N-β(aminoethyl)-γ-aminopropyl-trimethoxysilane (1.0) | 70 | 640 | 0.5 |
| Example 5 | 100 | N-phenyl-γ-aminopropyltrimethoxy-silane (1.0) | 70 | 670 | 0.5 |
| Comparative Example 1 | 100 | — | 70 | 500 | 0.3 |

TABLE 3

(Examples 6 to 8 and Comparative Examples 2 to 4)

| | polyphenylene sulfide resin (parts by weight) | γ-aminopropyl-triethoxysilane (parts by weight) | inorganic filler (parts by weight) | inorganic filler (parts by weight) | weld strength [kg/cm$^2$] | weld elongation at break [%] |
|---|---|---|---|---|---|---|
| Example 6 | 100 | 1.0 | glass fiber (100) | CaCO$_3$ (average particle size 4 μm) (100) | 620 | 0.5 |
| Comparative Example 2 | " | — | glass fiber (100) | CaCO$_3$ (average particle size 4 μm) (100) | 530 | 0.3 |
| Example 7 | 100 | 1.0 | glass fiber 100 | talc (average particle size 10 μm) (100) | 480 | 0.3 |
| Comparative Example 3 | " | — | glass fiber (100) | talc (average particle size 10 μm) (100) | 340 | 0.2 |
| Example 8 | 100 | 1.0 | cargon fiber (diameter 7 μm, length 6 mm) (40) | — | 680 | 0.5 |
| Comparative Example 4 | " | — | cargon fiber (diameter 7 μm, length 6 mm) (40) | — | 520 | 0.3 |

TABLE 4

(Examples 9 to 11 and Comparative Examples 5 to 7)

| | polyphenylene sulfide resin (parts by weight) | γ-aminopropyl-triethoxysilane (parts by weight) | glass fiber (parts by weight) | weld strength [kg/cm$^2$] | weld elongation at break [%] |
|---|---|---|---|---|---|
| Example 9 | 100 | 1.0 | 0 | 750 | 1.0 |
| Comparative Example 5 | " | — | " | 530 | 0.6 |
| Example 10 | 100 | 1.0 | 30 | 730 | 0.6 |
| Comparative Example 6 | " | — | " | 620 | 0.5 |
| Example 11 | 100 | 1.0 | 150 | 680 | 0.5 |
| Comparative Example 7 | " | — | " | 500 | 0.3 |

TABLE 5

(Example 12 and Comparative Example 8)

| | polyphenylene sulfide resin (parts by weight) | γ-aminopropyl triethoxysilane (parts by weight) | glass fiber (parts by weight) | molded article | breaking strength in forcing [kg] |
|---|---|---|---|---|---|
| Example 12 | 100 | 1.0 | 70 | cylindrical bearing (inside diameter 11φ, outside diameter 12.5φ) | 45 |
| Comparative Example 8 | " | — | " | cylindrical bearing (inside diameter 11φ, outside diameter 12.5φ | 39 |

TABLE 6

(Example 13 and Comparative Example 9)

| | polyphenylene sulfide resin (parts by weight) | γ-aminopropyl triethoxysilane (parts by weight) | glass fiber (parts by weight) | molded article | bending strength at break [kg] | deformation at break [mm] |
|---|---|---|---|---|---|---|
| Example 13 | 100 | 1.0 | 70 | circular plate (perforated) (inside diameter 30φ, outside diameter 80φ, | 300 | 1.9 |

TABLE 6-continued (Example 13 and Comparative Example 9)

| | polyphenylene sulfide resin (parts by weight) | γ-aminopropyl triethoxysilane (parts by weight) | glass fiber (parts by weight) | molded article | bending strength at break [kg] | deformation at break [mm] |
|---|---|---|---|---|---|---|
| Comparative Example 9 | " | — | " | thickness 3 mm) circular plate (perforated) (inside diameter 30φ, outside diameter 80φ, thickness 3 mm) | 180 | 1.1 |

USE OF OTHER AMINOALKOXSILANE

Example 14

γ-Glycidoxypropyltrimethoxysilane was added in an amount as shown in Table 7 to a polyphenylene sulfide resin (manufactured by Kureha Chemical Industry Co., Ltd., trade name: "Fortlon KPS"), followed by preliminary mixing with a Henschel mixer for 5 minutes. A commercially available glass fiber (diameter: 13 μm, length: 3 mm) was further added in an amount as shown in Table 7 to the resulting mixture, followed by mixing for 2 minutes. The resulting polyphenylene sulfide resin composition were pelletized using an extruder at a cylinder temperature of 310° C. Subsequently, a tensile test piece was molded using an injection molding machine and a test piece mold provided with two side gates designed so as to form a weld in the middle of a tensile test piece at a cylinder temperature of 320° C. and at a mold temperature of 150° C. The tensile strength and elongation of the weld of the test piece were measured. For reference, a test piece having no weld was molded using a mold provided with one gate and the same measurement as that mentioned above was conducted. The results are shown in Table 7.

Comparative Example 10

Test pieces were prepared in substantially the same respective manners as those of Example 14 except that no γ-glycidoxypropyltrimethoxysilane was used to measure the tensile strengths and elongations of the test pieces. The results are shown in Table 7 to 10.

Example 15

Test pieces were prepared in substantially the same respective manners as those of Example 14 except that γ-mercaptopropyltrimethoxysilane was used as a silane compound to measure the tensile strengths and elongations of the test pieces. The results are shown in Table 8.

Example 16

Test pieces were prepared in substantially the same respective manners as those Example 14 except that vinyltrimethoxysilane was used as a silane compound to measure the tensile strengths and elongations of the test pieces. The results are shown in Table 9.

Example 17 to 21

A test piece having a weld was prepared in substantially the same manner as that of Example 14 except that a material as shown in Table 13 was used as a silane compound to measure the tensile strength and elongation of the weld of the test piece were measured. The results are shown in Table 13.

Examples 22 to 24 and Comparative Examples 11 to 13

A test piece having a weld was prepared in substantially the same manner as that of Example 14 except that respective materials as shown in Table 11 were used as an epoxyalkoxysilane and an inorganic filler to measure the tensile strength and elongation of the weld of the test piece. The results are shown in Table 11.

Examples 25 to 27

A test piece having a weld was prepared in substantially the same manner as that of Example 14 except that respective materials as shown in Table 12 were used as a mercaptoalkoxysilane and an inorganic filler to measure the tensile strength and elongation of the weld of the test piece. The results are shown in Table 12.

Examples 28 to 30

A test piece having a weld was prepared in substantially the same manner as that of Example 14 except that respective materials as shown in Table 13 were used as a vinylalkoxysilane and an inorganic filler to measure the tensile strength and elongation of the weld of the test piece. The results are shown in Table 13.

Examples 31 to 36 and Comparative Examples 14 and 15

A test piece having a weld was prepared in substantially the same manner as that of Example 14 except that a silane compound and a glass fiber were used in respective amounts as shown in Table 14 to measure the tensile strength and elongation of the weld of the test piece. The results are shown in Table 14.

Examples 37 to 39 and Comparative Example 13

Pellets were prepared in substantially the same manner as that of Example 14 except that a silane compound and a glass fiber were used in respective amounts as shown in Table 15. Subsequently, a cylindrical bearing (inner diameter: 11 mmφ, outer diameter: 12.5 mmφ) was molded using an injection molding machine at a cylinder temperature of 320° C. and at a mold temperature of 150° C. The breaking strength of the obtained molding exhibited when a steel ball having a diameter of 14.2 mmφ was pressed into the hole of the molding was measured. The results are shown in Table 15.

Examples 40 to 42 and Comparative Example 17

Pellets were prepared in substantially the same manner as that of Example 14 except that a silane compound and a glass fiber were used in respective amounts as shown in Table 16. Subsequently, a disk having a hole (inner diameter: 30 mmφ, outer diameter: 80 mmφ, thickness: 3 mm, one-point pin gate) was molded using an injection molding machine at a cylinder temperature of 320° C. and at a mold temperature of 150° C. The breaking strength in bending and breaking deformation of the obtained molding was measured by setting the weld of the molding on a three-point bending strength tester. The results are shown in Table 16.

Examples 43 to 48

A silane compound given in Table 17 was added to a polyphenylene sulfide resin (mfd. by Kureha Chemical Industry Co., Ltd.; trade name "Fortron KPS") in an amount given in Table 17, followed by premixing with a Henschel mixer for 5 minutes. A commercially available glass fiber having a diameter of 13 μm and a length of 3 mm was added to the premix in an amount given in Table 17. The obtained mixture was mixed for 2 minutes and pelletized with an extruder at a cylinder temperature of 310° C. The obtained polyphenylene sulfide resin composition pellet was molded with an injection machine at a cylinder temperature of 320° C. and a mold temperature of 150° C. to obtain a connector having a width of 10 mm, a thickness of 5 mm and a length of 85 mm and 72 holes. This connector was examined for flexural breaking strength with a three-point bending tester. Further, the length of the flash generated in a clearance of 20 μ around an ejector pin was measured.

The above pellet was molded with an injection machine at a cylinder temperature of 320° C. and a mold temperature of 150° C. into a connector of 18 pins having a terminal hole size of 0.70 mm. A tapered pin having a tip of 0.30 mm, a rear end of 6 mm, a length of 30 mm and a thickness of 0.58 mm was press fitted into the terminal hole at a rate of 200 m/min to determine the strength at breaking. The results are shown in Table 17.

Comparative Example 18

A pellet was prepared in the same manner as that described in Examples 43 to 48 except that no silane compound was used and molded into a connector by the use of the same mold as that used in example 43. The obtained connector was examined for flexural breaking strength with a three-point bending tester. Further, the length of the flash generated around an ejector pin was measured. Then, the same connector for pin-press-fitting test as that described in Examples 43 to 48 was prepared by the use of the pellet and examined for breaking strength at press fitting a pin into its hole. The results are shown in Tables 17 to 20.

Example 49

The same procedure as that described in Example 43 was repeated except that the silane compound was replaced with γ-aminopropyltriethoxysilane in an amount given in Table 18 to obtain a connector. This connector was examined for flexural breaking strength and flash length. Further, the breaking strength at press fitting of a pin was determined. The results are shown in Table 18.

Example 50

The same procedure as that described in Example 45 was repeated except that the silane compound was replaced with γ-glycidoxypropyltrimethoxysilane in an amount give in Table 19 to obtain a connector. This connector was examined for flexural breaking strength and flash length. Further, the breaking strength at press fitting of a pin was determined. The results are shown in Table 19.

Example 51

The same procedure as that described in Example 47 was repeated except that the silane compound was replaced with vinyltrimethoxysilane in an amount given in Table 20 to obtain a connector. This connector was examined for flexural breaking strength and flash length. Further, the breaking strength at press fitting of a pin was also determined. The results are shown in Table 20.

Examples 52 to 60 and Comparative Examples 19 to 21

The same procedure as that described in Examples 43 to 48 was repeated except that a silane compound and an inorganic filler given in Table 21 were used in amounts given in Table 21 as the components (B) and (C), respectively, to obtain a connector. This connector was examined for flexural breaking strength and flash length. Further, the breaking strength at press fitting of a pin was determined. Results are shown in Table 21.

Examples 61 to 66 and Comparative Examples 22 and 23 the same procedure as that described in Examples 43 to 48 was repeated except that a silane compound and glass fiber given in Table 22 were used in amounts given in Table 22 to obtain a connector. This connector was examined for flexural breaking strength and flash length. Further, the breaking strength at press fitting of a pin was also determined. Results are shown in Table 22.

Examples 67 and 68 and Comparative Examples 24 and 25

The pellets prepared in Example 43 and Comparative Example 43 were molded into various articles given in Table 23. The obtained articles were examined for flexural breaking strength. The results are shown in Table 23.

TABLE 7

|  | Polyphenylene sulfide resin [wt. pt.] | γ-Glycidoxypropyl-trimethoxysilane [wt. pt.] | Glass fiber [wt. pt] | Strength of weld [kg/cm$^2$] | Breaking elongation of weld [%] | Strength of test piece having no weld [kg/cm$^2$] |
|---|---|---|---|---|---|---|
| Ex. 14-1 | 100 | 0.1 | 70 | 550 | 0.4 | 1730 |
| Ex. 14-2 | 100 | 0.3 | 70 | 620 | 0.5 | 1750 |
| Ex. 14-3 | 100 | 0.5 | 70 | 660 | 0.5 | 1770 |
| Ex. 14-4 | 100 | 1.0 | 70 | 720 | 0.6 | 1790 |
| Ex. 14-5 | 100 | 2.0 | 70 | 680 | 0.5 | 1760 |
| Comp. Ex. 10 | 100 | — | 70 | 500 | 0.3 | 1730 |

TABLE 8

| | Polyphenylene sulfide resin [wt. pt.] | γ-Mercaptopropyl-trimethoxysilane [wt. pt.] | Glass fiber [wt. pt.] | Strength of weld [kg/cm$^2$] | Breaking elongation of weld [%] | Strength of test piece having no weld [kg/cm$^2$] |
|---|---|---|---|---|---|---|
| Ex. 15-1 | 100 | 0.1 | 70 | 530 | 0.3 | 1720 |
| Ex. 15-2 | 100 | 0.3 | 70 | 650 | 0.5 | 1750 |
| Ex. 15-3 | 100 | 0.5 | 70 | 650 | 0.5 | 1770 |
| Ex. 15-4 | 100 | 1.0 | 70 | 710 | 0.6 | 1790 |
| Ex. 15-5 | 100 | 2.0 | 70 | 670 | 0.5 | 1770 |
| Comp. Ex. 11 | 100 | — | 70 | 500 | 0.3 | 1730 |

TABLE 9

| | Polyphenylene sulfide resin [wt. pt.] | Vinyl-trimethoxysilane [wt. pt.] | Glass fiber [wt. pt.] | Strength of weld [kg/cm$^2$] | Breaking elongation of weld [%] | Strength of test piece having no weld [kg/cm$^2$] |
|---|---|---|---|---|---|---|
| Ex. 16-1 | 100 | 0.1 | 70 | 550 | 0.4 | 1730 |
| Ex. 16-2 | 100 | 0.3 | 70 | 600 | 0.4 | 1750 |
| Ex. 16-3 | 100 | 0.5 | 70 | 620 | 0.5 | 1750 |
| Ex. 16-4 | 100 | 1.0 | 70 | 680 | 0.4 | 1760 |
| Ex. 16-5 | 100 | 2.0 | 70 | 590 | 0.4 | 1750 |
| Comp. Ex. 10 | 100 | — | 70 | 500 | 0.3 | 1730 |

TABLE 10

| | Polyphenylene sulfide resin [wt. pt.] | Silane compound [wt. pt.] | Glass fiber [wt. pt.] | Strength of weld [kg/cm$^2$] | Breaking elongation of weld [%] |
|---|---|---|---|---|---|
| Ex. 17 | 100 | γ-glycidoxypropyl-triethoxysilane 1.0 | 70 | 650 | 0.5 |
| Ex. 18 | 100 | β-(3,4-epoxy-cyclohexyl)ethyltri-methoxysilane 1.0 | 70 | 650 | 0.5 |
| Ex. 19 | 100 | γ-mercaptopropyl-triethoxysilane 1.0 | 70 | 630 | 0.5 |
| Ex. 20 | 100 | vinyltri-ethoxysilane 1.0 | 70 | 590 | 0.4 |
| Ex. 21 | 100 | vinyltris(β-methoxy-ethoxy)silane 1.0 | 70 | 570 | 0.4 |
| Comp. Ex. 10 | 100 | — | 70 | 500 | 0.3 |

TABLE 11

| | Polyphenylene sulfide resin [wt. pt.] | Epoxy-alkoxysilane [wt. pt.] | Inorganic filler [wt. pt.] | Inorganic filler [wt. pt.] | Strength of weld [kg/cm$^2$] | Breaking elongation of weld [%] |
|---|---|---|---|---|---|---|
| Ex. 22 | 100 | γ-glycidoxypropyl-trimethoxysilane 1.0 | glass fiber 100 | CaCO$_3$ (average particle size: 4 μm)100 | 620 | 0.5 |
| Comp. Ex. 11 | 100 | — | glass fiber 100 | CaCO$_3$ (average particle size: 4 μm)100 | 530 | 0.3 |
| Ex. 23 | 100 | γ-glycidoxypropyl-trimethoxysilane 1.0 | glass fiber 100 | talc (average particle size: 4 μm)100 | 450 | 0.3 |
| Comp. Ex. 12 | 100 | — | glass fiber 100 | talc (average particle size: 4 μm)100 | 340 | 0.2 |
| Ex. 24 | 100 | γ-glycidoxypropyl-trimethoxysilane 1.0 | carbon fiber 40 | — | 670 | 0.5 |
| Comp. Ex. 13 | 100 | — | carbon fiber 40 | — | 520 | 0.3 |

TABLE 12

| | Polyphenylene sulfide resin [wt. pt.] | Mercaptoalkoxysilane [wt. pt.] | Inorganic filler [wt. pt.] | Inorganic filler [wt. pt.] | Strength of weld [kg/cm$^2$] | Breaking elongation of weld [%] |
|---|---|---|---|---|---|---|
| Ex. 25 | 100 | γ-mercaptopropyl-trimethoxysilane 1.0 | glass fiber 100 | CaCO$_3$ (average particle size: 4 μm)100 | 620 | 0.5 |
| Comp. Ex. 11 | 100 | — | glass fiber 100 | CaCO$_3$ (average particle size: 4 μm)100 | 530 | 0.3 |
| Ex. 26 | 100 | γ-mercaptopropyl-trimethoxysilane 1.0 | glass fiber 100 | talc (average particle size: 4 μm)100 | 440 | 0.3 |
| Comp. Ex. 12 | 100 | — | glass fiber 100 | talc (average particle size: 4 μm)100 | 340 | 0.2 |
| Ex. 27 | 100 | γ-mercaptopropyl-trimethoxysilane 1.0 | carbon fiber 40 | — | 650 | 0.5 |
| Comp. Ex. 13 | 100 | — | carbon fiber 40 | — | 520 | 0.3 |

TABLE 13

| | Polyphenylene sulfide resin [wt. pt.] | Vinylalkoxysilane [wt. pt.] | Inorganic filler [wt. pt.] | Inorganic filler [wt. pt.] | Strength of weld [kg/cm$^2$] | Breaking elongation of weld [%] |
|---|---|---|---|---|---|---|
| Ex. 28 | 100 | vinyltrimethoxysilane 1.0 | glass fiber 100 | CaCO$_3$ (average particle size: 4 μm) 100 | 600 | 0.5 |
| Comp. Ex. 11 | 100 | — | glass fiber 100 | CaCO$_3$ (average particle size: 4 μm) 100 | 530 | 0.3 |
| Ex. 29 | 100 | vinyltrimethoxysilane 1.0 | glass fiber 100 | talc (average particle size: 4 μm) 100 | 450 | 0.3 |
| Comp. Ex. 12 | 100 | — | glass fiber 100 | talc (average particle size: 4 μm) 100 | 340 | 0.2 |
| Ex. 30 | 100 | vinyltrimethoxysilane 1.0 | carbon fiber 40 | — | 620 | 0.5 |
| Comp. Ex. 13 | 100 | — | carbon fiber 40 | — | 520 | 0.3 |

TABLE 14

| | Polyphenylene sulfide resin [wt. pt.] | Silane compound [wt. pt.] | Glass fiber [wt. pt.] | Strength of weld [kg/cm$^2$] | Breaking elongation of weld [%] |
|---|---|---|---|---|---|
| Ex. 31 | 100 | γ-glycidoxypropyl-trimethoxysilane 1.0 | 0 | 720 | 1.0 |
| Ex. 32 | 100 | γ-mercaptopropyl-trimethoxysilane 1.0 | 0 | 720 | 1.0 |
| Ex. 33 | 100 | vinyltrimethoxysilane 1.0 | 0 | 690 | 1.0 |
| Comp. Ex. 14 | 100 | — | 0 | 530 | 0.6 |
| Ex. 34 | 100 | γ-glycidoxypropyl-trimethoxysilane 1.0 | 150 | 670 | 0.5 |
| Ex. 35 | 100 | γ-mercaptopropyl-trimethoxysilane 1.0 | 150 | 650 | 0.5 |
| Ex. 36 | 100 | vinyltrimethoxysilane 1.0 | 150 | 610 | 0.4 |
| Comp. Ex. 15 | 100 | — | 150 | 500 | 0.3 |

TABLE 15

| | Polyphenylene sulfide resin [wt. pt.] | Silane compound [wt. pt.] | Glass fiber [wt. pt.] | Molding | Breaking strength in pressing ball into hole [kg] |
|---|---|---|---|---|---|
| Ex. 37 | 100 | γ-glycidoxypropyl-trimethoxysilane 1.0 | 70 | cylindrical bearing (inner diameter: 11 mmφ, outer diameter: 12.5 mmφ) | 46 |
| Ex. 38 | 100 | γ-mercaptopropyl-trimethoxysilane 1.0 | 70 | cylindrical bearing (inner diameter: 11 mmφ, outer diameter: 12.5 mmφ) | 45 |
| Ex. 39 | 100 | vinyltrimethoxysilane 1.0 | 70 | cylindrical bearing (inner diameter: 11 mmφ, outer diameter: 12.5 mmφ) | 43 |
| Comp. Ex. 16 | 100 | — | 70 | cylindrical bearing (inner diameter: 11 mmφ, outer diameter: 12.5 mmφ) | 36 |

TABLE 16

| | Polyphenylene sulfide resin [wt. pt.] | Silane compound [wt. pt.] | Glass fiber [wt. pt.] | Molding | Breaking strength in bending [kg] | Breaking deformation [mm] |
|---|---|---|---|---|---|---|
| Ex. 40 | 100 | γ-glycidoxypropyl-trimethoxysilane 1.0 | 70 | disk (perforated) (inner diameter: 30 mmφ, outer diameter: 80 mmφ, thickness: 3 mm) | 310 | 1.9 |
| Ex. 41 | 100 | γ-mercaptopropyl-trimethoxysilane 1.0 | 70 | disk (perforated) (inner diameter: 30 mmφ, outer diameter: 80 mmφ, thickness: 3 mm) | 270 | 1.7 |
| Ex. 42 | 100 | vinyltrimethoxysilane 1.0 | 70 | disk (perforated) (inner diameter: 30 mmφ, outer diameter: 80 mmφ, thickness: 3 mm) | 250 | 1.5 |
| Comp. Ex. 17 | 100 | — | 70 | disk (perforated) (inner diameter: 30 mmφ, outer diameter: 80 mmφ, thickness: 3 mm) | 180 | 1.1 |

TABLE 17

| | Composition | | | Flexural breaking strength [kg] | Flash length [μm] | Breaking strength at press fitting of pin [kg] |
|---|---|---|---|---|---|---|
| | polyphenylene sulfide resin (parts by weight) | silane compound (parts by weight) | inorganic filler (parts by weight) | | | |
| Ex. 43 | 100 | γ-aminopropyltri-ethoxysilane 1.0 | glass fiber (diameter: 13 μm, length: 3 mm) 70 | 37 | 80 | 12.7 |
| Ex. 44 | 100 | N-β(aminoethyl)-γ-aminopropyltri-methoxysilane 1.0 | glass fiber (diameter: 13 μm, length: 3 mm) 70 | 38 | 94 | 11.9 |
| Ex. 45 | 100 | γ-glycidoxypropyl-trimethoxysilane 1.0 | glass fiber (diameter: 13 μm, length: 3 mm) 70 | 34 | 90 | 11.3 |
| Ex. 46 | 100 | β-(3,4-epoxycyclo-hexyl)ethyltri-methoxysilane 1.0 | glass fiber (diameter: 13 μm, length: 3 mm) 70 | 31 | 111 | 10.5 |
| Ex. 47 | 100 | vinyltrimethoxy- | glass fiber | 32 | 143 | 11.0 |

TABLE 17-continued

| | Composition | | | Flexural breaking strength [kg] | Flash length [μm] | Breaking strength at press fitting of pin [kg] |
|---|---|---|---|---|---|---|
| | polyphenylene sulfide resin (parts by weight) | silane compound (parts by weight) | inorganic filler (parts by weight) | | | |
| | | silane 1.0 | (diameter: 13 μm, length: 3 mm) 70 | | | |
| Ex. 48 | 100 | vinyltris (β-methoxyethoxy)silane 1.0 | glass fiber (diameter: 13 μm, length: 3 mm) 70 | 30 | 161 | 11.7 |
| Comp. Ex. 18 | 100 | — | glass fiber (diameter: 13 μm, length: 3 mm) 70 | 21 | 425 | 7.2 |

TABLE 18

| | Composition | | | Flexural breaking strength [kg] | Flash length [μm] | Breaking strength at press fitting of pin [kg] |
|---|---|---|---|---|---|---|
| | polyphenylene sulfide resin (parts by weight) | γ-aminopropyl-triethoxysilane (parts by weight) | inorganic filler (parts by weight) | | | |
| Ex. 49-1 | 100 | 0.1 | glass fiber (diameter: 13 μm, length: 3 mm) 70 | 24 | 199 | 8.1 |
| Ex. 49-2 | 100 | 0.3 | glass fiber (diameter: 13 μm, length: 3 mm) 70 | 27 | 163 | 8.9 |
| Ex. 49-3 | 100 | 0.5 | glass fiber (diameter: 13 μm, length: 3 mm) 70 | 32 | 101 | 10.3 |
| Ex. 49-4 | 100 | 2.0 | glass fiber (diameter: 13 μm, length: 3 mm) 70 | 34 | 172 | 11.2 |
| Comp. Ex. 18 | 100 | — | glass fiber (diameter: 13 μm length: 3 mm) 70 | 21 | 425 | 7.2 |

TABLE 19

| | Composition | | | Flexural breaking strength [kg] | Flash length [μm] | Breaking strength at press fitting of pin [kg] |
|---|---|---|---|---|---|---|
| | polyphenylene sulfide resin (parts by weight) | γ-glycidoxypropyl-trimethoxysilane (parts by weight) | inorganic filler (parts by weight) | | | |
| Ex. 50-1 | 100 | 0.1 | glass fiber (diameter: 13 μm, length: 3 mm) 70 | 25 | 217 | 7.9 |
| Ex. 50-2 | 100 | 0.3 | glass fiber (diameter: 13 μm, length: 3 mm) 70 | 27 | 188 | 9.2 |
| Ex. 50-3 | 100 | 0.5 | glass fiber (diameter: 13 μm, length: 3 mm) 70 | 32 | 136 | 10.2 |
| Ex. 50-4 | 100 | 2.0 | glass fiber (diameter: 13 μm, length: 3 mm) 70 | 35 | 144 | 10.7 |
| Comp. Ex. 18 | 100 | — | glass fiber (diameter: 13 μm, length: 3 mm) 70 | 21 | 425 | 7.2 |

TABLE 20

| | Composition | | Flexural breaking strength [kg] | Flash length [μm] | Breaking strength at press fitting of pin [kg] |
|---|---|---|---|---|---|
| | polyphenylene sulfide resin (parts by weight) | vinyltrimethoxy-silane (parts by weight) | inorganic filler (parts by weight) | | |
| Ex. 51-1 | 100 | 0.1 | glass fiber (diameter: 13 μm, length: 3 mm) 70 | 26 | 230 | 7.8 |
| Ex. 51-2 | 100 | 0.3 | glass fiber (diameter: 13 μm, length: 3 mm) 70 | 27 | 207 | 8.2 |
| Ex. 51-3 | 100 | 0.5 | glass fiber (diameter: 13 μm, length: 3 mm) 70 | 30 | 188 | 9.4 |
| Ex. 51-4 | 100 | 2.0 | glass fiber (diameter: 13 μm, length: 3 mm) 70 | 30 | 129 | 10.3 |
| Comp. Ex. 18 | 100 | — | glass fiber (diameter: 13 μm, length: 3 mm) 70 | 21 | 425 | 7.2 |

TABLE 21

| | Composition | | | | Flexural breaking strength [kg] | Flash length [μm] | Breaking strength at press fitting of pin [kg] |
|---|---|---|---|---|---|---|---|
| | Polyphenylene sulfide resin (parts by weight) | silane compound (parts by weight) | inorganic filler (parts by weight) | inorganic filler (parts by weight) | | | |
| Ex. 52 | 100 | γ-aminopropyltri-ethoxysilane 1.0 | glass fiber (diameter: 13 μm, length: 3 mm) 100 | CaCO₃ (average particle size: 4 μm) 100 | 20 | 31 | 9.2 |
| Ex. 53 | 100 | γ-glycidoxypropyl-trimethoxysilane 1.0 | glass fiber (diameter: 13 μm, length: 3 mm) 100 | CaCO₃ (average particle size: 4 μm) 100 | 21 | 35 | 8.6 |
| Ex. 54 | 100 | vinyltrimethoxy-silane 1.0 | glass fiber (diameter: 13 μm, length: 3 mm) 100 | CaCO₃ (average particle size: 4 μm) 100 | 19 | 86 | 8.3 |
| Comp. Ex. 19 | 100 | — | glass fiber (diameter: 13 μm, length: 3 mm) 100 | CaCO₃ (average particle size: 4 μm) 100 | 14 | 122 | 5.0 |
| Ex. 55 | 100 | γ-aminopropyltri-methoxysilane 1.0 | glass fiber (diameter: 13 μm, length: 3 mm) 100 | talc (average particle size: 10 μm) 100 | 24 | 20 | 9.1 |
| Ex. 56 | 100 | γ-glycidoxypropyl-trimethoxysilane 1.0 | glass fiber (diameter: 13 μm, length: 3 mm) 100 | talc (average particle size: 10 μm) 100 | 18 | 27 | 9.0 |
| Ex. 57 | 100 | vinyltrimethoxy-silane 1.0 | glass fiber (diameter: 13 μm, length: 3 mm) 100 | talc (average particle size: 10 μm) 100 | 18 | 42 | 7.9 |
| Comp. Ex. 20 | 100 | — | glass fiber (diameter: 13 μm, length: 3 mm) 100 | talc (average particle size: 10 μm) 100 | 13 | 91 | 4.8 |
| Ex. 58 | 100 | γ-aminopropyltri-ethoxysilane 1.0 | carbon fiber (diameter: 7 μm, length: 6 mm) 40 | — | 43 | 72 | 12.0 |
| Ex. 59 | 100 | γ-glycidoxy-propyltrimethoxy-silane 1.0 | carbon fiber (diameter: 7 μm, length: 6 mm) 40 | — | 38 | 90 | 11.2 |
| Ex. 60 | 100 | vinyltrimethoxy-silane 1.0 | carbon fiber (diameter: 7 μm, length: 6 mm) 40 | — | 34 | 119 | 9.5 |
| Comp. Ex. 21 | 100 | — | carbon fiber (diameter: 7 μm, length: 6 mm) | — | 26 | 539 | 6.7 |

TABLE 21-continued

| Composition | | | | Flexural breaking strength [kg] | Flash length [μm] | Breaking strength at press fitting of pin [kg] |
|---|---|---|---|---|---|---|
| Polyphenylene sulfide resin (parts by weight) | silane compound (parts by weight) | inorganic filler (parts by weight) | inorganic filler (parts by weight) | | | |
| | | 40 | | | | |

TABLE 22

| | Composition | | | Flexural breaking strength [kg] | Flash length [μm] | Breaking strength at press fitting of pin [kg] |
|---|---|---|---|---|---|---|
| | polyphenylene sulfide resin (parts by weight) | silane compound (parts by weight) | inorganic filler (parts by weight) | | | |
| Ex. 61 | 100 | γ-aminopropyltri-ethoxysilane 1.0 | — | 13 | 110 | 22.0 |
| Ex. 62 | 100 | γ-glycidoxypropyl-trimethoxysilane 1.0 | — | 12 | 144 | 20.1 |
| Ex. 63 | 100 | vinyltrimethoxy-silane 1.0 | — | 12 | 297 | 19.6 |
| Comp. Ex. 22 | 100 | — | — | 9 | 782 | 14.9 |
| Ex. 64 | 100 | γ-aminopropyltri-ethoxysilane 1.0 | glass fiber (diameter: 13 μm, length: 3 mm) 150 | 49 | 32 | 10.5 |
| Ex. 65 | 100 | γ-glycidoxypropyl-trimethoxysilane 1.0 | glass fiber (diameter: 13 μm, length: 3 mm) 150 | 47 | 38 | 10.4 |
| Ex. 66 | 100 | vinyltrimethoxy-silane 1.0 | glass fiber (diameter: 13 μm, length: 3 mm) 150 | 42 | 85 | 10.0 |
| Comp. Ex. 23 | 100 | — | glass fiber (diameter: 13 μm, length: 3 mm) 150 | 34 | 180 | 6.2 |

TABLE 23

| | Composition | | | Molding article | Flexural breaking strength [kg] |
|---|---|---|---|---|---|
| | polyphenylene sulfide resin (parts by weight) | γ-aminopropyltri-ethoxysilane (parts by weight) | inorganic filler (parts by weight) | | |
| Ex. 67 | 100 | 1.0 | glass fiber (diameter: 13 μm, length: 3 mm) 70 | rectangular connector of 18 holes (width: 10 mm thickness: 5 mm length: 31 mm) | 101 |
| Comp. Ex. 24 | 100 | — | glass fiber (diameter: 13 μm, length: 3 mm) 70 | rectangular connector of 18 holes (width: 10 mm thickness: 5 mm length: 31 mm) | 84 |
| Ex. 68 | 100 | 1.0 | glass fiber (diameter: 13 μm, length: 3 mm) 70 | rectangular connector of 48 holes (width: 10 mm thickness: 5 mm length: 55 mm) | 67 |
| Comp. Ex. 25 | 100 | — | glass fiber (diameter: 13 μm, length: 3 mm) 70 | rectangular connector of 48 holes (width: 10 mm thickness: 5 mm length: 55 mm) | 44 |

We claim:

1. An injection molded polyarylene sulfide article having at least one weld portion between at least first and second regions of said article, which weld portion is formed by opposing melt flows during injection molding of said article, said article consisting essentially of a polyarylene sulfide composition comprising (A) 100 parts by weight of a polyarylene sulfide resin, and (B) an amount between 0.01 to 5 parts by weight of an alkoxysilane sufficient to strengthen said weld portion, wherein said alkoxysilane is selected from the group consisting of aminoalkoxysilanes, epoxyalkoxysilanes, mercaptoalkoxysilanes and vinylalkoxysilanes.

2. A molded article as claimed in claim 1, in which said composition further comprises (C) up to 400 parts by weight of an inorganic filler.

3. A molded article as claimed in claim 1, in which said alkoxysilane consists of an aminoalkoxysilane.

4. A molded article as claimed in claim 3, in which the polyarylene sulfide is a polyphenylene sulfide having at least 90 mole percent phenylene sulfide units.

5. A molded article as claimed in claim 1, in which said alkoxysilane consists of an epoxyalkoxysilane.

6. A molded article as claimed in claim 3, in which the polyarylene sulfide is a polyphenylene sulfide having at least 70 mole percent phenylene sulfide units.

7. A molded article as claimed in claim 3, in which the aminoalkoxysilane has one or more amino groups and two or three alkoxy groups, the alkoxy group having 1 or 2 carbon atoms.

8. A molded article as claimed in claim 5, in which the alkoxysilane compound has at least, one epoxy, mercapto or vinyl group and two or three alkoxy groups each having 1 to 3 carbon atoms.

9. A molded article as claimed in claim 1 which is in the form of a part for an electric appliance, a precision instrument, or an apparatus for a chemical process.

10. A molded article as claimed in claim 1, which is in the form of an electrical connector.

* * * * *

UNITED STATES PATENT AND TRADEMARK OFFICE
CERTIFICATE OF CORRECTION

PATENT NO. : 4,917,957

DATED : April 17, 1990

INVENTOR(S) : Nitoh et al

It is certified that error appears in the above-identified patent and that said Letters Patent is hereby corrected as shown below:

Column 1, line 9, after "invention" delete the comma (,);
        line 21, after "class" insert --of--;
        line 30, after "having" insert --a--;
        line 32, after "regard" delete "A" and change "polyarylene" to --Polyarylene--;
        line 66, after "Thus," delete "a".

Column 2, line 6, after "above" delete "disadvantageous" and insert --disadvantages--;
        line 9, after "design" insert --)--.

Column 4, line 34, after "of" delete "them" and insert --two or more of the same--;
        line 41, after "integrating" delete "of" and insert --or--.

Column 5, line 14, after "has" insert --a--;
        line 24, change "include" to --includes--;
        line 28, change "heater" to --heaters--.

Column 6, line 40, change "reduces" to --reduced--.

Signed and Sealed this

Sixth Day of August, 1991

Attest:

HARRY F. MANBECK, JR.

*Attesting Officer*        *Commissioner of Patents and Trademarks*